United States Patent [19]
Stauffer

[11] 3,906,219
[45] Sept. 16, 1975

[54] FOCUS DETECTING APPARATUS

[75] Inventor: Norman L. Stauffer, Englewood, Colo.

[73] Assignee: Honeywell Inc., Minneapolis, Minn.

[22] Filed: Oct. 9, 1973

[21] Appl. No.: 404,318.

[52] U.S. Cl. ................ 250/204; 250/234; 250/233; 354/25; 356/125
[51] Int. Cl. ............................................. G01j 1/36
[58] Field of Search ........... 250/203, 233, 201, 234, 250/208, 209, 204, 235, 578; 354/195, 25; 353/101; 356/125, 126

[56] References Cited
UNITED STATES PATENTS

| | | | |
|---|---|---|---|
| 2,927,216 | 3/1960 | Lohninger | 250/204 |
| 3,450,883 | 6/1969 | Thomas | 250/204 |
| 3,532,045 | 10/1970 | Genahr | 354/25 |
| 3,553,455 | 1/1971 | Sato et al. | 250/201 |
| 3,610,934 | 10/1971 | Turner | 250/201 |
| 3,631,785 | 1/1972 | Perlman et al. | 356/126 X |
| 3,634,689 | 1/1972 | Ejiri et al. | 250/235 |
| 3,682,071 | 8/1972 | Hosoe | 250/208 X |

*Primary Examiner*—Walter Stolwein
*Attorney, Agent, or Firm*—Arthur H. Swanson; Lockwood D. Burton; George E. Bodenstein

[57] ABSTRACT

A focus detecting system includes a lens device for forming an image of an object on a predetermined plane through an optical path. A semi-circular opaque masking device is arranged to rotate in the optical path to cyclically mask a portion of the optical path. A light responsive device is positioned at the predetermined plane to respond to the light from the lens device for producing electrical signals representative of the instaneous intensity distribution of the image formed at the predetermined plane. The intensity distribution of the light falling on the sensing device, is modulated by the rotating opaque semi-circular disc, and varies as a function of the condition of focus of the image. A signal processing circuit responds to the electrical signals to provide an output signal indicative of the condition of focus of the image.

5 Claims, 7 Drawing Figures

FOCUS DETECTING APPARATUS

CROSS REFERENCE TO RELATED APPLICATIONS

Subject matter disclosed but not claimed herein is disclosed and claimed in two copending applications of Norman L. Stauffer, Ser. Nos. 404,319 and 404,320, both filed even date herewith.

BACKGROUND OF THE INVENTION

Field of the Invention

The present invention relates generally to automatic focussing systems; in particular, to a focus position detecting apparatus for use with cameras and the like, such as may be found in Patent Office Class 250, sub class 204.

In the past, most automatic focussing systems for use in cameras, for example, have required two basic motions. One is the motion of a focussing lens with respect to a plane upon which a focussed image of a scene is to be formed. The second motion is a scanning motion of a light detector with respect to the image at the image plane. As the lens moves from one extremity to another in a predetermined path of travel, a point will be encountered at which a major portion of a scene being formed on an image plane will be in focus. The focussed portion of the image is characterized by abrupt contrast changes of a focussed image. If the image is continually scanned during the lens movement, the image contrast changes may be detected to provide an indication of the condition of focus of the image through relatively complex frequency content analysis circuits. Some focus detecting systems have been developed which obviate the need for complex electrical frequency content analysis circuits in order to determine the best focus position of the objective lens. However, those systems have introduced other disadvantages such as being optically complex, costly, and relatively inaccurate. Other systems rely on a comparison of signals produced by corresponding light responsive elements. Those systems, while generally satisfactory, assume identical response characteristics of the corresponding light responsive elements.

SUMMARY OF THE INVENTION

It is, accordingly, an object of the present invention to provide a focus detecting apparatus which obviates the disadvantages of prior art devices.

It is another object of the present invention to provide a focus detecting apparatus which requires no frequency analysis in order to determine the best focus position of an objective lens.

It is yet another object of the present invention to provide a focus detecting apparatus as set forth, which is relatively simple in design.

It is a further object of the present invention to provide a focus detecting apparatus as set forth, which is more accurate and reliable than prior art devices.

In accomplishing these and other objects there has been provided, in accordance with the present invention, an improved focus detecting apparatus which includes an image forming device for forming an image of an object through a predetermined optical path and varying the condition of focus of that image. A masking device is arranged to cyclically mask a portion of the optical path thereby repetitively varying the positional relation of the masked portion of the optical path. A sensing device is positioned in the optical path to respond to the light forming the image for producing electrical signals representative of the instantaneous intensity distribution of the image. The intensity distribution of the light falling on the sensing device is modulated by the masking device, and varies as a function of the condition of focus of the image. A signal processing circuit responds to the electrical signals to provide an output signal indicative of the condition of focus of the image.

BRIEF DESCRIPTION OF THE DRAWINGS

A better understanding of the present invention may be had from the following detailed description, when read in connection with the accompanying drawings, in which.

DESCRIPTION OF THE PREFERRED EMBODIMENTS

Figure 1:
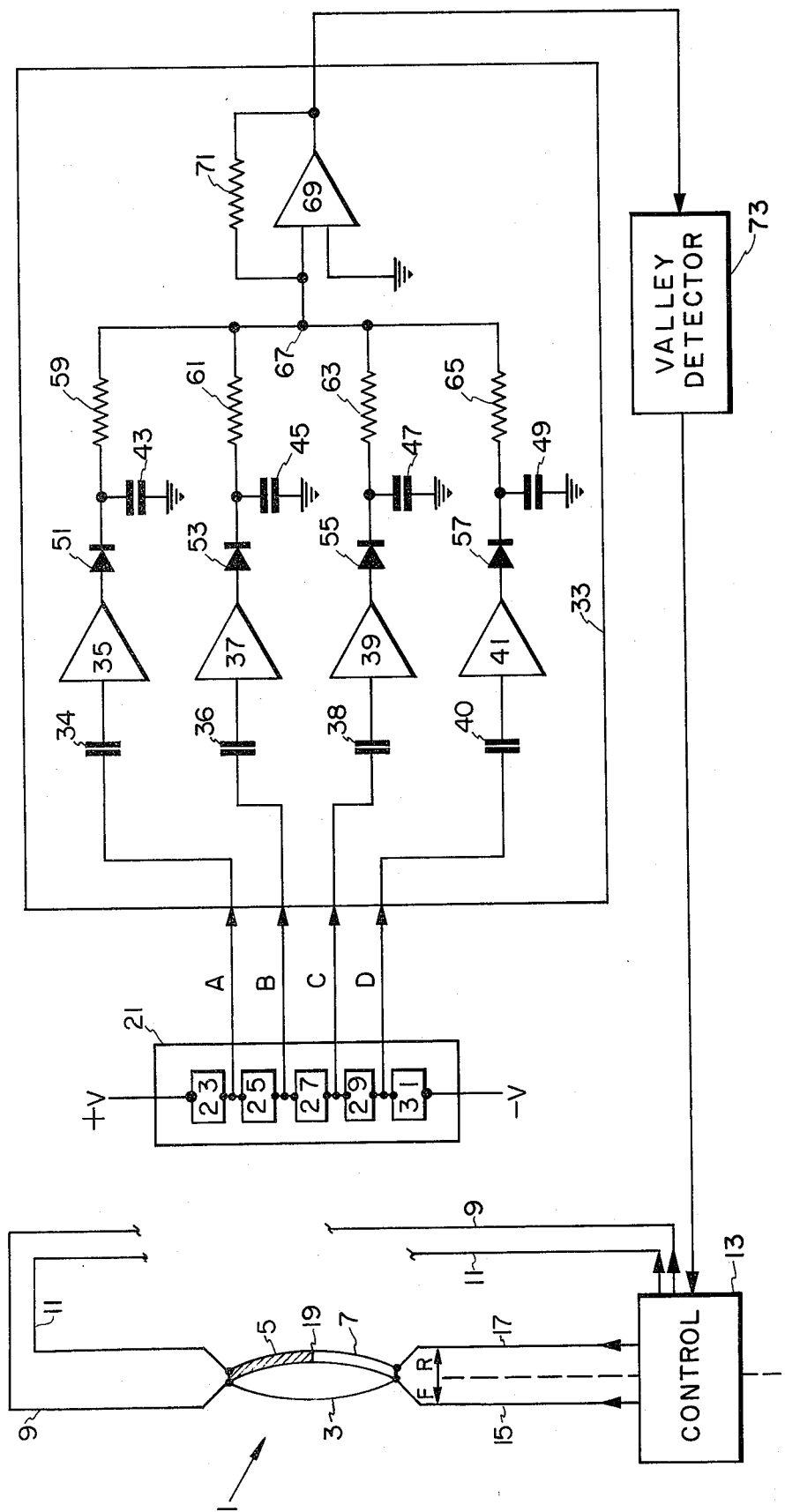
FIG. 1 is a schematic diagram of one embodiment of the present invention.

Referring to FIG. 1 in detail, a lens device 1 includes an optical lens 3. The lens 3 has first and second electrically responsive optical gates 5 and 7 disposed thereon. In the present example, each optical gate may be comprised of liquid crystal or other material which responds to a first voltage to become opaque and to a second voltage to become clear. The first optical gate 5 is semicircular in configuration and is shown opaque in the figure. Optical gate 5 receives an exciting voltage through leads 9 and 11 from a control means 13. The second optical gate 7 is also semicircular and receives exciting voltage from the control means 13 through leads 15 and 17. The first and second semicircular light gates 5 and 7 are joined at the center line 19 thus dividing the lens device 1 into two selectively gated light paths, one blocked and one unblocked each receiving a distinct control signal from the control circuit 13. The first optical gate 5 at a given instant may for example have a voltage supply which would render it opaque while the second optical gate 7 has a potential applied thereto rendering it clear, as shown in the figure. The control means 13 is also operative to move the lens device 1 in forward F and reverse R directions and may be implemented to be coordinated with and control the movement of a principal lens 14 of a camera in which case the movement of the principal lens 14 which focusses an image of an object on a light sensitive film 16, may be terminated when the focus detecting system indicates that the image or the light sensitive film 16 is in sharpest focus.

A light responsive sensing device 21 includes five photo responsive elements 23, 25, 27, 29, and 31. The five photo responsive elements, which in the present example are photo-resistive, are series connected between +V and −V reference potentials. The common junctions between the photo resistive elements provide electrical signals A, B, C, and D which are, in turn, applied to a signal processing circuit 33. The photo resistive elements 23, 25, 27, 29 and 31 are arranged in the light responsive sensing device 21 to receive light from a relatively distant object, (not shown) which passes through the unblocked portion of the lens device 1.

Each of the electrical signals A, B, C and D is applied to an associated amplifier 35, 37, 39 and 41, respectively, through respective capacitors 34, 36, 38, and 40. The output from each amplifier 35, 37, 39 and 41 is connected through the anode to cathode path of associated diodes 51, 53, 55 and 57, respectively, to one terminal of the associated capacitor 43, 45, 47 and 49, respectively. The other terminals of the capacitors 43, 45, 47 and 49 are connected to a common reference potential of, for example, zero volts. The cathode terminals of the diodes 51, 53, 55 and 57 are also connected through associated resistors 59, 61, 63 and 65 to a common point 67. The common point 67 is connected to a first input terminal of an amplifier 69. A second input terminal of the amplifier 69 is connected to the common reference potential. The output terminal of the amplifier 69 is connected through a feedback resistor 71 to the first input terminal thereof. The output of the amplifier 69 also provides an output signal from the signal processing circuit 33 to a valley detector circuit 73. The valley detector circuit, in turn, provides a signal which is applied to the control means 13 to control the movement of the lens device 1 and concurrently to control the movement of a principal focussing lens 14 of a camera.

It should be noted that the light responsive sensing device 21 including the photo resistive elements 23, 25, 27, 29 and 31 is only shown schematically in FIG. 1 and that in an actual construction the faces of the photo resistive elements 23, 25, 27, 29 and 31 are actually facing the lens device 1 to respond to the light passing therethrough.

Figure 2:
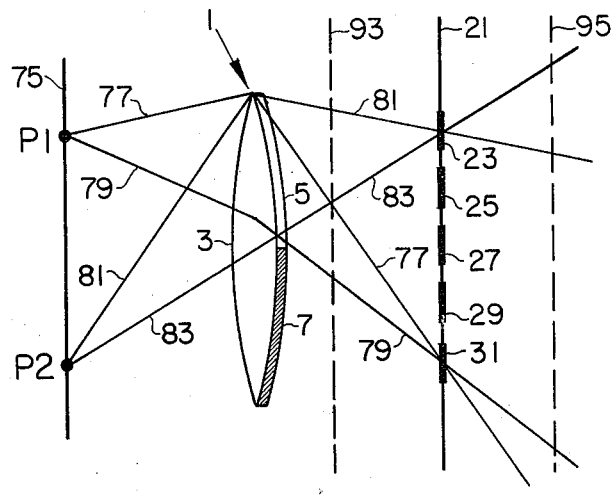
FIG. 2 is a schematic diagram useful in explaining the operation of the present invention.
Figure 3:
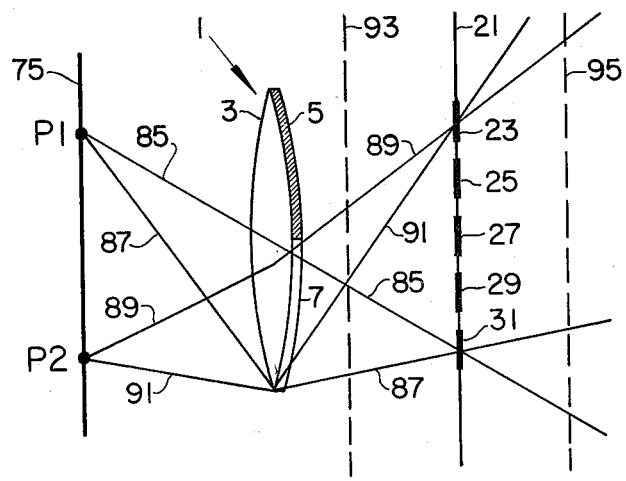
FIG. 3 is a schematic diagram further illustrating the operation of the present invention.
Figure 4:
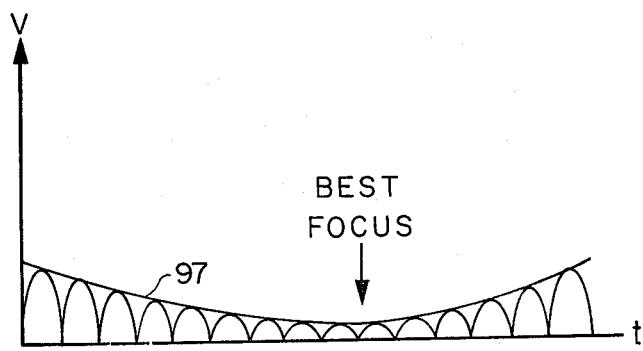
FIG. 4 is a graphic illustration showing the derivation of the output signal of the present invention.

In explaining the operation of the present invention, reference is now had to FIGS. 2, 3 and 4. In FIG. 2, an object 75, the image of which is to be focussed, includes 2 points of reference P1 and P2. Each point of reference has two radiation beams emanating therefrom. Beams 77 and 79 emanate from point P1 and beams 81 and 83 emanate from point P2. In FIG. 2, radiation beams from the points on the object 75 pass through the upper portion of the lens device 1 since the upper mask 5 is clear and the lower mask 7 is opaque. The light responsive sensing device 21 is arranged to receive that radiation and provide the resultant signals A, B, C and D as shown in FIG. 1. In FIG. 2, the lens device 1 is shown in a position at which the image formed on the light responsive sensing device 21 is in focus. It should be noted, that the radiation beams 77 and 79 emanating from the point P1 form a single point on the photo responsive element 31 of the light responsive sensing device 21. Similarly, the beams 81 and 83 from the point P2 of the object 75 converge to form an image of the point P2 on the photo resistive element 23 of the light responsive sensing device 21.

FIG. 3 shows the optical system of FIG. 2 at a time when the lower mask 7 of the lens device 1 is transparent, thereby allowing light to pass therethrough, and the upper semicircular mask 5 is opaque thereby blocking radiation from passing therethrough. Again, in FIG. 3, the lens device 1 is in the position at which an image of the object 75 is focussed upon the light responsive device 21. The radiation beams 85 and 87 converge to form an image of the point P1 upon the photo resistive element 31, while radiation beams 89 and 91 converge to form an image of the point P2 upon the photo resistive element 23. It can therefore be seen from FIGS. 2 and 3 that when the lens device 1 is in the proper focus position, the alternate blocking of a portion of the optical path between the object 75 and the light responsive sensing device 21 has no substantial effect on the resultant signals A, B, C and D provided by the light responsive sensing device 21. That is, as the lens device 1 is switched between top-half transmission and bottom-half transmission, substantially the same amount of illumination will fall on each photo resistive element 23, 25, 27 and 29 and 31 of the light responsive sensing device 21. The electrical signals A, B, C and D will not vary substantially i.e. they will vary minimally and appear as D.C. signals when the lens device 1 is in the proper focus position. However, if the lens device 1 were moved forward or rearward of its focus position for any given object, there will be a substantial variation in the electrical signals A, B, C and D as the top and bottom portions of the lens device 1 are alternately rendered transmissive. For example, in FIG. 2 if the lens device 1 were moved away from its focus position toward the light responsive sensing device 21, the light responsive sensing device 21 would appear at a plane as shown at 93 in FIG. 2 with respect to the lens device 1. On the other hand, if the lens device 1 were moved out of its focus position toward the object 75, the light responsive sensing device 21 would appear at a plane in the position 95 with respect to the lens device 1. In either case, there will be a substantial change in the magnitude of the electrical signals A, B, C, and D generated as the top and bottom halves of the lens device 21 are alternately rendered transmissive. For example, with the lens device 1 moved toward the light responsive device 21 so the light responsive device 21 appears at the position 93 with respect to the lens device 1, radiation beams from either point P1 or P2 on the object 75 will not fall on the same photo resistive element as the top and bottom portions of the lens device are alternately rendered transmissive. Radiation from the point P1, when the top portion of the lens device 1 is transmissive, would illuminate the photo resistive element 27 and part of the photo resistive element 29. However, when the bottom portion of the lens device 1 is transmissive, radiation from the point P1 would illuminate the photo resistive element 31 and a portion of the photo resistive element 29. Therefore, as different portions of the optical path between the object 75 and the light responsive device 21 are alternately blocked out, the effective illumination distribution falling on the light responsive device 21 will vary and as a result the electrical signals A, B, C and D will also vary substantially and appear as A.C. signals. The signals thus provided are generally shown in FIG. 4.

In FIG. 4 the waveform represents a typical one of the signals A, B, C or D. Substantial changes in voltage are shown as the top and bottom portions of the lens device are alternately rendered conductive and the lens device 1 is not in its proper focus position. However, as the lens device 1 approaches best focus position, those changes in each electrical signal are substantially reduced and approach a minimal change when the lens device 1 is actually in its best focus position. Each of the AC electrical signals A, B, C and D is amplified, rectified, and filtered to provide a filtered signal which corresponds to the envelope 97 of the peak value. Those "envelope" or filtered signals are then added together by a signal processing circuit 33 to provide the output signal which is applied to the valley detector circuit 73. The valley detector circuit 73 detects the valley or minimum value of the output signal, at which time a signal is provided to the control means 13 to terminate the movement of the lens device 1 and the principal lens 14 in its detected best focus position.

Figure 5:
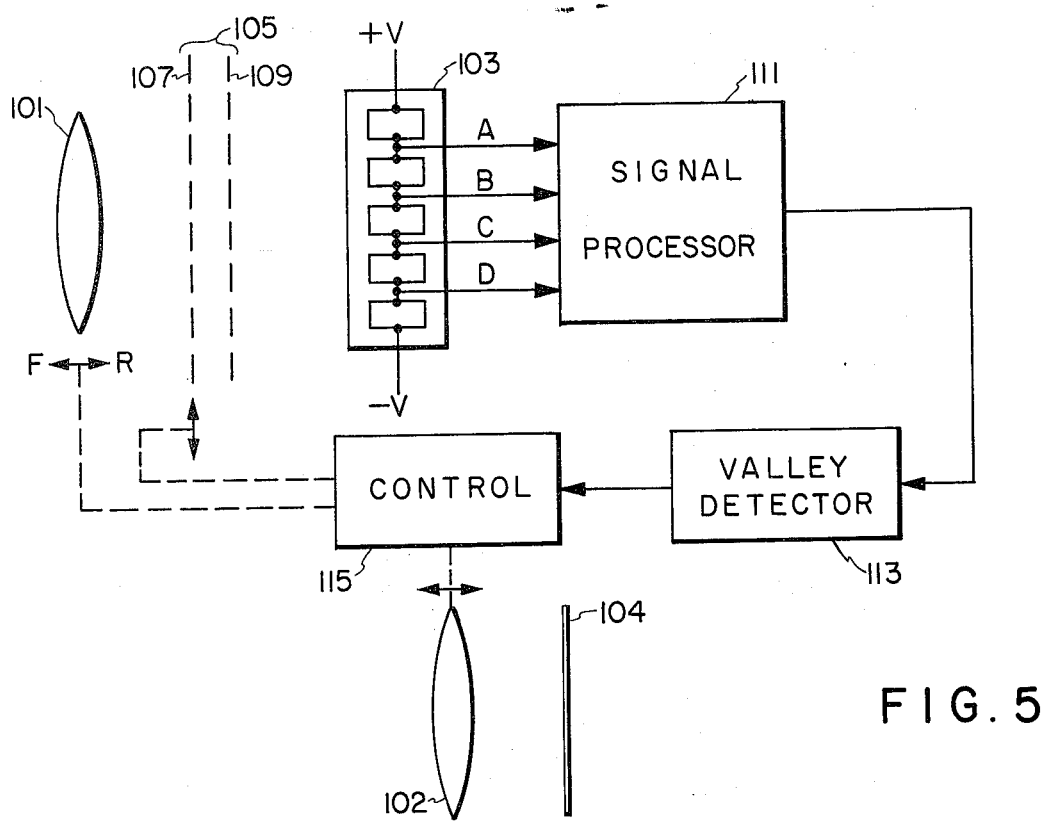
FIG. 5 is a schematic diagram of another embodiment of the present invention.

FIG. 5 shows another embodiment of the present invention. A lens device 101 is movable in forward F and reverse R directions to vary the condition of focus of an image formed thereby on a light responsive sensing device 103. In the optical path between the lens device 101 and the light responsive sensing device 103, a light gate 105 is interposed. The light gate 105 is comprised of two apertured or slitted masks, a movable mask 107 and a stationary mask 109. Radiation from an object, the image of which is to be focussed on the light responsive device 103, is selectively passed through the apertures in the gate 105 to form an image of that object on the light responsive sensing device 103. The movable mask 107 of the gate 105 moves up and down with an oscillatory movement to be defined more particularly hereinafter, to effectively select the radiation beams impinging thereon at various angles from the object (not shown). When the moveable mask 107 of the light gate 105 is in one extreme position, only light rays passing through the lens device 101 at a first angle with respect to the central axis of the lens device 101 will impinge upon the light responsive sensing device 103. As the moving portion 107 of the light gate 105 moves towards its other extreme position, radiation having different angles of incidence will be allowed to fall on the light responsive sensing device 103 until at the other extreme position only radiation from a second extreme angle will pass through the gate 105. Because of the geometry of the system, when the movable mask is in one extreme position, the angle of light passage effectively allows only light passing through the top portion of the lens 101 to impinge on the light responsive sensing device 103, and when the movable mask is in the other extreme position, only radiation passing through the bottom portion of the lens 101 is passed to form an image on the light responsive sensing device 103.

The light responsive device 103 is comprised in the illustrative embodiment, of five photo resistive elements serially connected between +V and −V potentials. As was the case in FIG. 1, the electrical signals A, B, C and D provided by the light responsive device 103 are applied to a signal processor circuit 111. The output from the signal processor is supplied to a valley detector circuit 113 which, in turn, provides a signal which is applied to a control device 115 which controls the movement of the lens device 101 and an objective lens 102, the latter being operative to vary the condition of focus of an image on a light sensitive film 104 of a camera, for example.

In operation, the embodiment shown in FIG. 5 provides a similar output signal to that shown in FIG. 1. When the image of the object is focussed on the light responsive device 103, the magnitude of the electrical signals A, B, C and D will remain substantially unchanged as the moving portion 107 of the light gate 105 is moved between its extreme positions. That will be true since when the image is focussed on the light responsive sensing device 103, the light distribution of that image will be the same as the mask 107 moves since the image will remain focussed regardless of which particular light rays effect the formation of that image. On the other hand, when the lens device 101 is not in its proper focus position, the image formed on the light responsive sensing device 103 will not be in the best condition of focus and the light distribution pattern appearing on the light responsive device 103 will vary as the movable mask 107 of the light gate 105 moves between its extreme positions. When the lens device 101 is not in its proper focus position, the radiation intensity distribution appearing on the light responsive device 103 will depend upon which rays of light are passed from the object from the lens device 101 and the light gate 105. Therefore, as the movable portion 107 oscillates between its extreme positions while the lens device 101 is concurrently being progressively moved in either the forward F or rearward R directions, the electrical signals A, B, C and D will exhibit a degree of change and appear as A.C. signals when the lens device 101 is not in its focus position; substantially no change will be exhibited, however, and signals A, B, C and D will appear as D.C. signals when the lens device 101 is in its proper focus position. The speed of oscillation of movable mask 107 is many times greater than the speed with which the lens device 101 moves in forward and rearward directions and, consequently, for any given position of the lens device 101, the movable mask 107 completes at least one complete scan between its extreme positions. Therefore, by sensing when the electrical signals A, B, C and D exhibit a minimum change, the lens device 101 is in its best focus position. The signal processor circuit 111 of FIG. 5 may be identical to the signal processor circuit 33 of FIG. 1. The valley detector circuit 113 is substantially the same as the valley detector circuit 73 in FIG. 1 and provides a signal to the control means 115 when a valley or minimal variation in the signal from the processor 111 is detected. That minimal or valley point on the output signal of the signal processor circuit 111 is indicative of the fact that the lens device 101 is in its proper focus position. Accordingly, the control means 115 may be designed to terminate the movement of the lens device 101, the movable mask 107 and the objective lens 102 when that minimal or valley value of the output signal has been detected.

Figure 6:
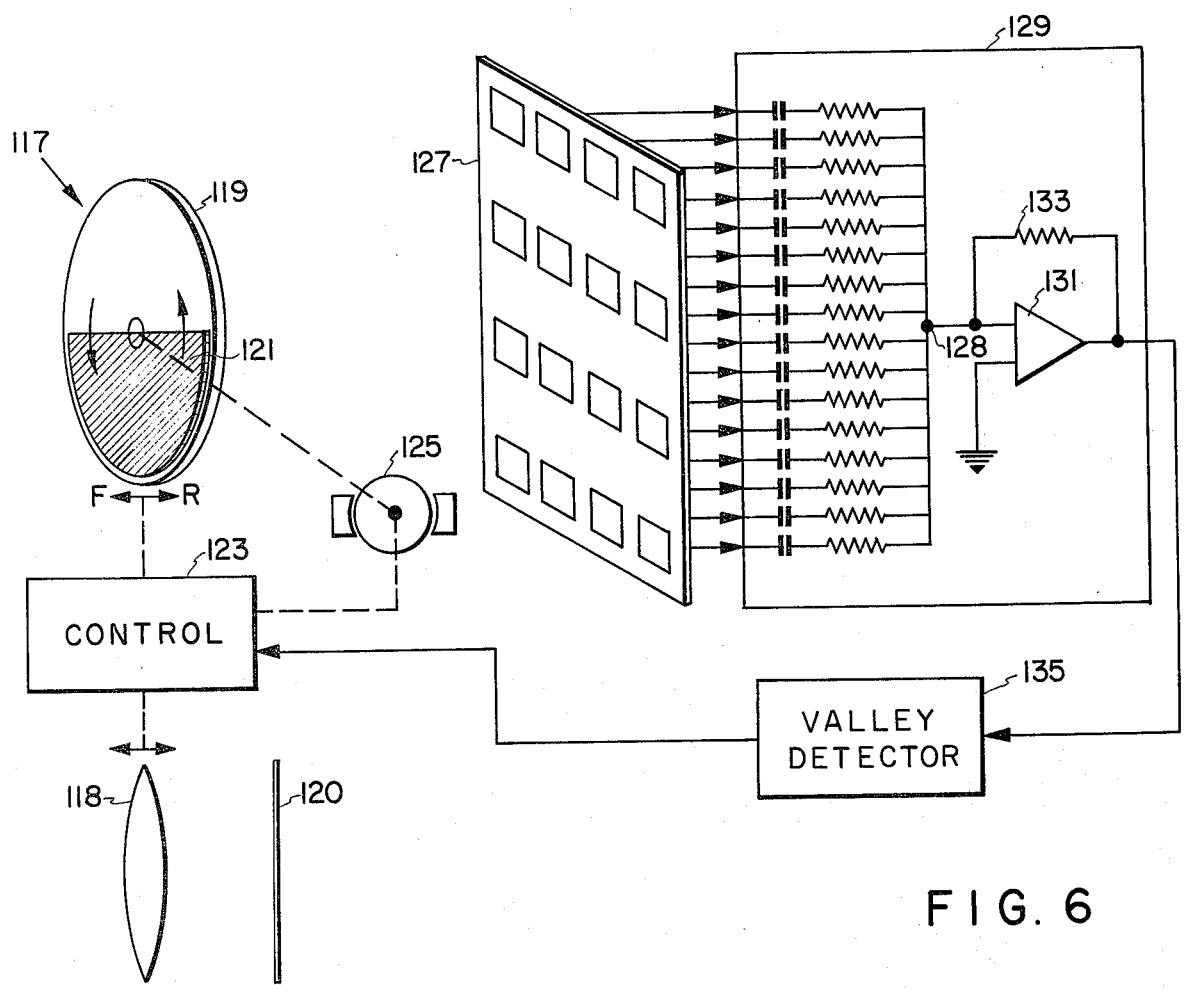
FIG. 6 is a schematic diagram of still another embodiment of the present invention.

In FIG. 6 a lens device 117 includes an optical lens 119 and a rotating, semi-circular, opaque mask 121 mounted thereon. The lens device 117, as controlled by a control means 123, is movable in forward F and reverse or rearward R directions. The control means 123 controls the movement of an objective lens 118 which is operable to focus an image of an object on a light sensitive film 120. The control circuit 123 also controls the operation of a motor 125 which in turn effects the rotation of the semi-circular mask 121. The semi-circular mask 121 is made to rotate at a faster rate than the linear cyclic movement of the lens device 117 so a plurality of rotations of the semi-circular mask 121 may occur for substantially any given incremental movement of the lens device 117 in the forward F or rearward R directions.

Figure 7:
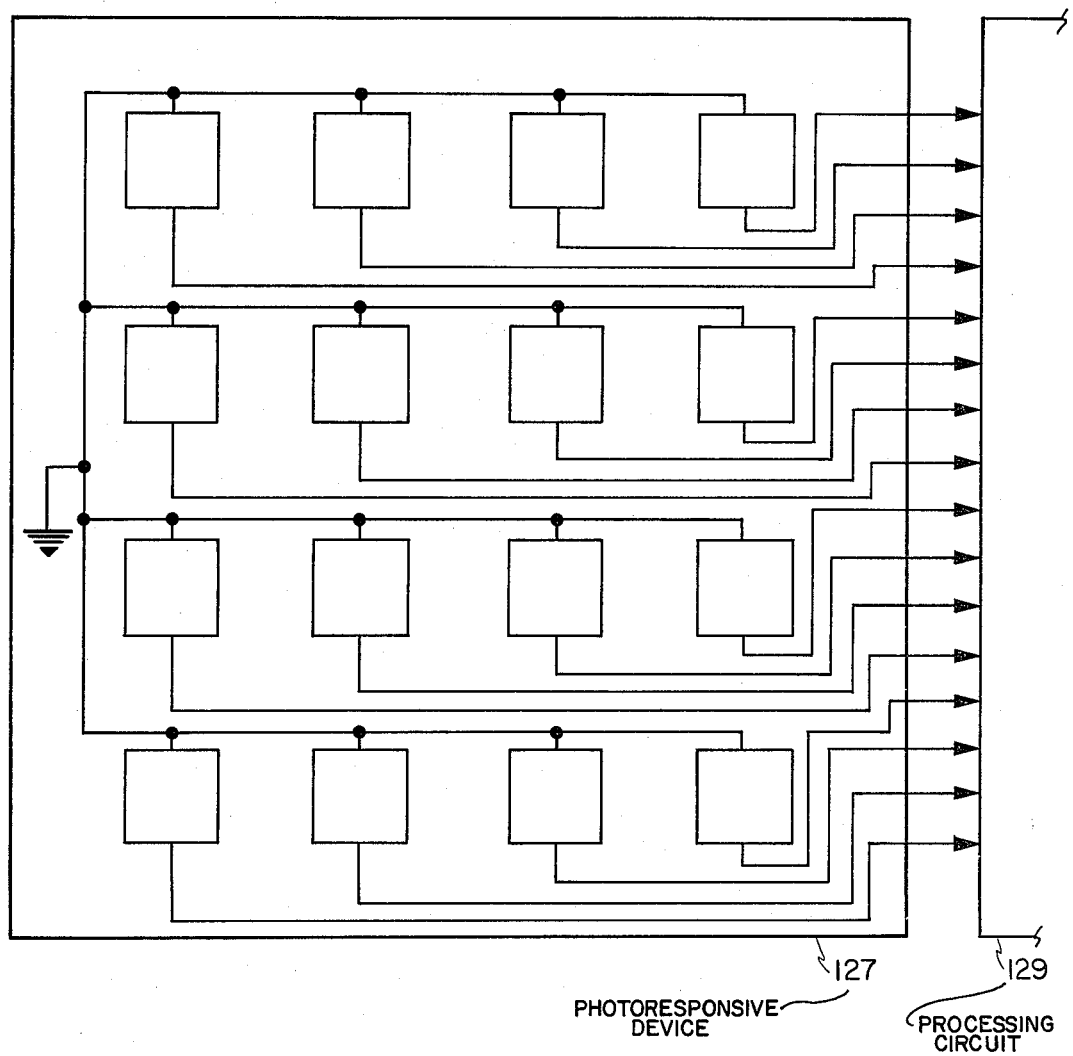
FIG. 7 is a schematic diagram of the light responsive device used in the embodiment shown in FIG. 6.

A photo responsive device 127 is comprised, in the illustrative embodiment, of 16 photo-voltaic elements arranged in a square pattern with four rows of four elements each. Each photo-voltaic element provides its own electrical signal as is more clearly shown in FIG. 7. The electrical signal provided by each of the photo-voltaic elements in the light responsive device 127 is representative of the intensity of the light falling thereon. The electrical signals thereby provided are applied to a processing circuit 129. The electrical signal provided by each of the photo-voltaic elements of the light responsive device 127 is applied, through separate serial capacitor-resistor circuits, to a common summing junction 128 within the processing circuit 129. The summing junction 128 is connected to a first input terminal of an amplifier 131, the second input terminal of which is connected to a reference potential of, for example, zero volts. A feedback resistor 133 connects the output terminal of the amplifier 131 with its first input terminal. The output terminal of the amplifier 131 provides the output signal from the processing circuit 129 which is applied to a valley detector circuit 135. The valley detector circuit 135, in turn, provides a signal which is applied to the control means 123 for controlling the movement of the lens device 117 and the motor 125.

To better understand the operation in the embodiment shown in FIG. 6, it is helpful to refer back to the operation of the embodiment shown in FIG. 1. In FIG. 1, when the image was properly focussed on the light responsive sensing device 21, substantially no changes would occur in the signals A, B, C and D as opposite halves of the lens device 1 were alternately rendered transmissive. That was true since only one-half of an optical lens is sufficient to focus an image of an object. In like manner, with the rotating blocking mask 121 in any given position such as, for example, blocking the bottom half of the lens 119 as shown in FIG. 6, an image of the object will be formed on a light responsive device 127 from radiation coming from the object and passing through the top portion of the lens 119. If the image formed on the light responsive sensing device 127 is properly focussed, the light distribution pattern of that image will not be changed as the mask 121 is rotated about the axis of the lens 119 since the image will remain in focus regardless of which particular radiation beams form it. However, as hereinbefore explained in connection with FIGS. 2 and 3, when the image appearing at the light responsive sensing device 127 is not properly focussed, the selection of the radiation beams from the object which form the image will have a substantial effect on the radiation distribution on the light responsive sensing device. That is, as the rotating disc 121 rotates about the axis of the lens 119, it effectively selects different radiation beams by selecting different paths through which radiation from the object will pass in forming an image on the light responsive sensing device 127. The rotating disc 121 therefore will also effect a variation in the raidation intensity distribution when the image formed on the light responsive sensing device 127 is not properly focussed. Therefore, when the image on the light responsive sensing device 127 is properly focussed, no significant changes will appear in the signals provided by the photo-voltaic elements in the light responsive device 127 as the rotating mask 121 rotates about the axis of the lens 119. Since no changes in the signals from the photo-voltaic elements occur, no A.C. signals will be coupled through the coupling portion of the signal processing circuit 129 and the output signal from the signal processing circuit will be at a minimal value. That minimal value is detected by the valley detector circuit 135 which, in turn, applies a signal to the control circuit 123 which will terminate the movement of the lens 119 in the proper focus position. If the image on the light responsive device 127 is not properly focussed, the light distribution pattern will change as the rotating mask 121 rotates about the lens 119. The change in the distribution pattern will accordingly effect the generation of AC signals by the photo-voltaic elements in the light responsive device 127. Those AC signals are coupled through their associated capacitor and resistor coupling circuits in the signal processing circuit 129 and are added together at the common or summing junction 128. When those AC signals are summed together and amplified by the amplifier 131, an output signal will be provided by the signal processing circuit 129 which will be significantly greater in magnitude than the minimal signal provided when substantially no variation in the light distribution pattern of the image on the light responsive sensing device 127 appeared. Since the ouput signal when the image is not properly focussed is not at a minimal value, the valley detector circuit will not operate to provide a signal to terminate the movement of the lens device 117 and therefore the lens device 117 will continue to be moved in either the forward or rearward direction until such a minimally valued output signal from the signal processing circuit appears.

Thus, there has been provided, in accordance with the present invention, an improved focus detecting apparatus which is more accurate and reliable than prior art devices and which is simple in design and requires neither frequency component analysis nor matching of light responsive elements.

The embodiments of the present invention in which an exclusive property or privilege is claimed are defined as follows:

1. A focus condition detecting apparatus for use in focussing an image of an object, comprising
    light sensing means including a plurality of light sensing elements spatially distributed in an array in a given plane, each of said elements providing an electrical signal representative of the intensity of light falling thereon,
    optical means having a central axis and an entrance pupil and positioned to form on said plane, over an optical path through said pupil, a light image of said object,
    cyclically operated light gating means comprising an opaque mask positioned substantially at said optical means and arranged to be rotated about said central axis of said optical means and further arranged, when so rotated, to cylically block successive spatially separate areas of said entrance pupil of said optical means, to cause light from said object to reach said sensing means cylically from said spatially separate areas and to cause said image and hence the distribution of light to shift cyclically over said array of sensing elements to an extent dependent upon the extent to which said image is out of focus on said plane, said image and light distribution remaining substantially stationary on said array of sensing elements, notwithstanding said cyclic operation of said gating means, when said image is in focus on said plane, and means connected to said sensing elements and responsive to said signals to provide an output signal representative of the condition of focus of said image on said plane.

2. The focus detecting apparatus as set forth in claim 1 wherein said means responsive to said electrical signals includes means for summing said electrical signals for providing an output signal the magnitude of which is related to the condition of focus of said image.

3. The focus detecting apparatus as set forth in claim 1 wherein said elements are photo-voltaic cells.

4. The focus detecting apparatus as set forth in claim 1 wherein said elements are photo-resistors.

5. An automatic focussing apparatus for use in focussing a principle image of an object, comprising lens means for forming a principle light image of an object on a light sensitive film, light sensing means including a plurality of light sensing elements spatially distributed in an array in a given plane, each of said elements providing an electrical signal representative of the intensity of light falling thereon, optical means having a central axis and an entrance pupil and positioned to form on said plane, over an optical path through said pupil, an auxiliary light image of said object, cylically operated light gating means comprising an opaque mask positioned substantially at said optical means and arranged to be rotated about said central axis of said optical means and further arranged, when so rotated, to cyclically block successive spatially separate areas of said entrance pupil of said optical means, to cause light from said object to reach said sensing means cyclically from said spatially separate areas and to cause said auxiliary image and hence the distribution of light to shift cyclically over said array of sensing elements to an extent dependent upon the extent to which said auxiliary image is out of focus on said plane, said auxiliary image and light distribution remaining substantially stationary on said array of sensing elements, notwithstanding said cyclic operation of said gating means, when said auxiliary image is in focus on said plane, means connected to said sensing elements and responsive to said signals to provide an output signal representative of the extent of said cyclic shifting of said auxiliary image on said plane, and control means connected to receive said output signal and connected to adjust the relative positions of said optical means and said plane, and simultaneously to adjust the relative positions of said lens means and said film, said control means being responsive to said output signal to adjust the relative positions of said optical means and said plane to those at which said output signal indicates a minimum in said cyclic shifting of said auxiliary image on said plane, the corresponding adjusted relative positions of said lens means and said film then being those which cause said principle image to be focussed on said film.

* * * * *